United States Patent [19]

Terao et al.

[11] 4,035,842

[45] July 12, 1977

[54] RECORDED VIDEO SIGNAL REPRODUCING APPARATUS CAPABLE OF REPRODUCING STOP MOTION STILL PICTURES

[75] Inventors: Yoshikazu Terao; Katsuhisa Muto, both of Yokohama, Japan

[73] Assignee: Victor Company of Japan, Limited, Yokohama, Japan

[21] Appl. No.: 607,755

[22] Filed: Aug. 26, 1975

[30] Foreign Application Priority Data

Aug. 27, 1974 Japan ........................... 49-98082
Aug. 27, 1974 Japan ........................... 49-98083
Aug. 27, 1974 Japan ........................ 49-102656[U]
Aug. 27, 1974 Japan ........................ 49-102657[U]
Aug. 27, 1974 Japan ........................ 49-102658[U]

[51] Int. Cl.² .................... H04M 5/78; G11B 15/66
[52] U.S. Cl. .................................. 360/10; 360/85
[58] Field of Search ............................ 360/10, 85

[56] References Cited

U.S. PATENT DOCUMENTS

| | | | |
|---|---|---|---|
| 3,375,331 | 3/1968 | Okazaki et al. | 360/10 |
| 3,697,676 | 10/1972 | Protas | 360/10 |
| 3,792,491 | 2/1974 | Inaga | 360/85 |

Primary Examiner—Robert S. Tupper

[57] ABSTRACT

A reproducing apparatus recorded video signal uses a guide drum having at least one rotating head. A stop motion mechanism automatically loads or lays out a tape from a tape cassette, along a predetermined tape traveling path. A mechanism drives the tape in the predetermined tape traveling path and stops the tape. A mechanism operates the tape in its stopped state to change the shape of the predetermined tape traveling path and the length of the tape in the tape traveling path, thereby to cause a displacement of a part of the tape in wrapping contact with the guide drum. A mechanism controls the operation of the tape displacing mechanism in a manner such that the rotating head rotates and scans the tracks on the stopped tape and carries out the desired reproduction of a still picture.

8 Claims, 14 Drawing Figures

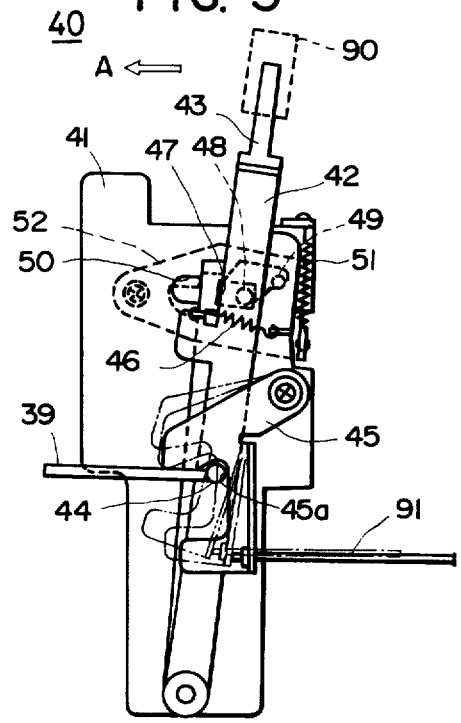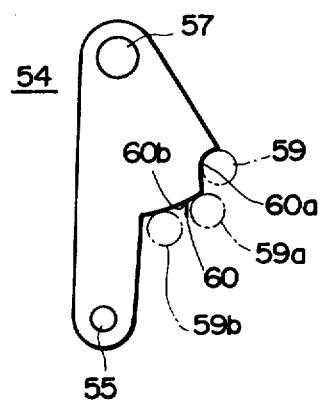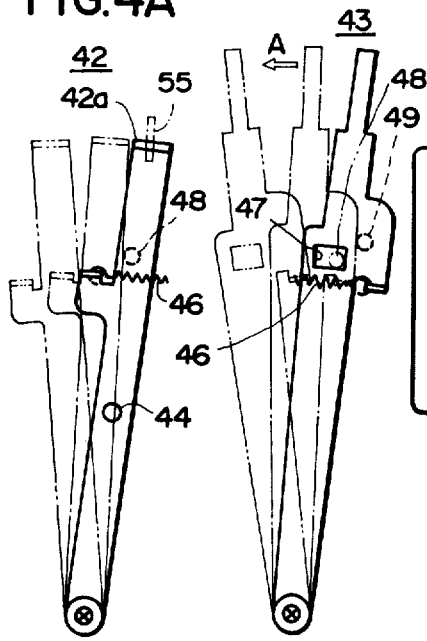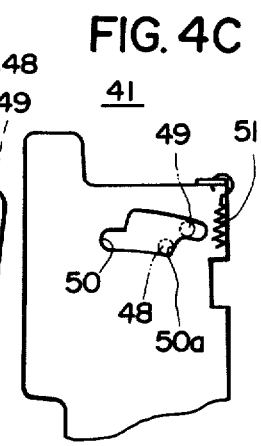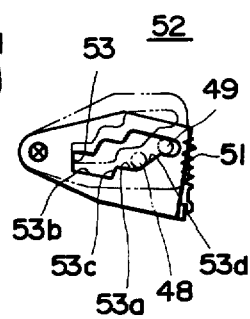

RECORDED VIDEO SIGNAL REPRODUCING APPARATUS CAPABLE OF REPRODUCING STOP MOTION STILL PICTURES

BACKGROUND OF THE INVENTION

The present invention relates generally to reproducing apparatus using recorded video tapes for reproducing still pictures. More particularly, it relates to an apparatus for reproducing still pictures by means of a rotating head while the travel of the recording tape is stopped. The positions of the tracks on the tape are adjusted relative to the scanning path of the rotating head. Still picture reproduction can thus be accomplished with little noise and high quality.

In a known apparatus, in the reproducing mode of operation, a pinch roller is separated from the capstan while, at the same time, the travel of the magnetic tape is stopped by braking the reel disc on the tape supply side. Reproduction of a still picture is then carried out. In general, the angle of the scanning track by the rotating head on the magnetic tape at the time when the tape is traveling differs from the track followed when the tape is stopped. For this reason, the rotating head departs from recorded tracks and traverses over a guard band (a part of the tape left unrecorded to prevent crosstalk between tracks). Noise is thereby generated in the reproduced still picture.

In this case, according to conventional practice, the operator turns supply reel or the take-up reel very slightly by hand. This slight movement positions the tape in wrapping contact with the guide drum and causes the rotating head to scan the guard band in the tape part corresponding to a vertical synchronizing signal. Then, the above mentioned noise falls within vertical blanking periods in the reproduced picture. Manual control, however, required skill, and, furthermore, the operational accuracy is poor. Particularly in a reproducing apparatus of the cassette or cartridge type, the reels cannot be manipulated directly. It is then impossible to carrying out the above described control procedure.

Furthermore, there has been an apparatus wherein the travel of the magnetic tape is stopped by stopping the rotation of the capstan with the pinch roller still pressed against the capstan. In this apparatus, however, in order to eliminate substantial noise accompanying the above mentioned guard band, there is the necessity of moving the tape by turning slightly the capstan, whereby the apparatus tends to become complicated and expensive.

SUMMARY OF THE INVENTION

Accordingly, it is a general object of the present invention to provide a novel and useful reproducing apparatus for reproducing still picture in which the above described difficulties have been overcome.

Another and more specific object of the invention is to provide a reproducing apparatus wherein a tape is drawn out of a tape cassette and is automatically loaded or laid out along a prescribed tape travel path. In a part of the path, the tape is in wrapping contact around a guide drum. In this apparatus, a still picture is obtained by stopping the travel of the tape while a rotating head repeatedly reproduces one and the same track on the tape. In this operation, the length of the prescribed tape travel path is changed to displace the tape in wrapping contact with the guide drum. By this tape displacement, the relative positions of the scanning path of the rotating head and of the track on the tape can be adjusted to prevent the generation of noise in a reproduced still picture.

Still another object of the invention is to provide a reproducing apparatus, of the type referred to above, having simple means for changing the length of the tape travel path.

A further object is to provide a reproducing apparatus, of the above stated type, having means for varying the inclination angle of a wrapping contact of the tape around the guide drum when the tape travel is stopped, and for causing the scanning path of the rotating head at the time when the tape is stopped to be the same as or parallel to the path followed while the tape is travelling.

Other objects and further features of the present invention will be apparent from the following detailed description when read in conjunction with the accompanying drawings.

BRIEF DESCRIPTION OF THE DRAWINGS

In the drawings:

FIG. 3 is an elevation view taken along the line III—III in FIG. 1, as viewed in the arrow direction, showing the details of a still picture reproduction control mechanism;

FIGS. 4A through 4D are elevation views respectively showing various parts which constitute the reproduction control mechanism, shown in FIG. 3;

FIG. 5 is an enlarged plan view of a cam plate of the apparatus shown in FIGS. 1 and 2;

DETAILED DESCRIPTION

Figure 1:
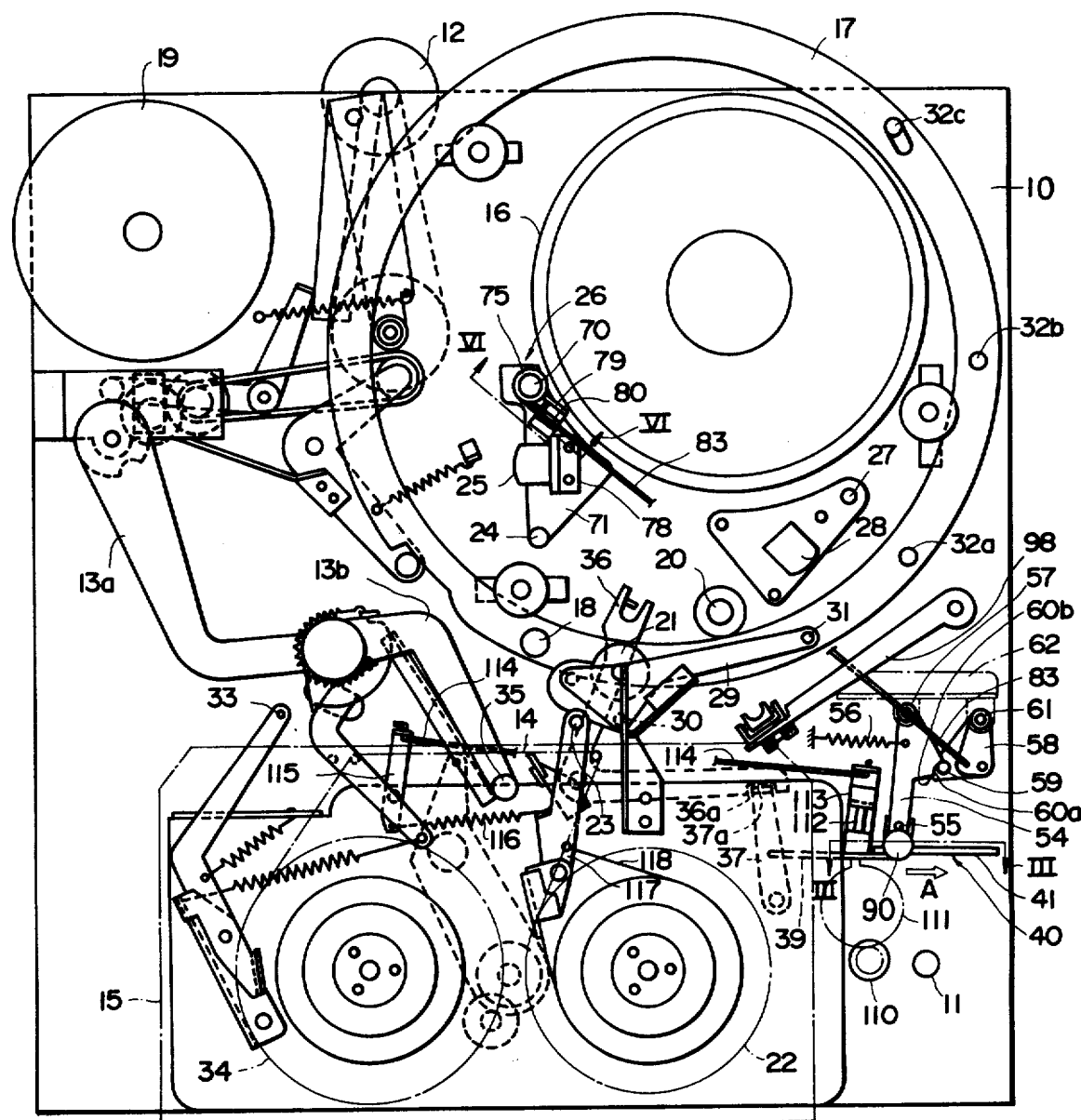
FIG. 1 is a plan view showing mechanism, parts of one embodiment of the magnetic reproducing apparatus, according to the present invention, in the stopped mode of operation.
Figure 2:
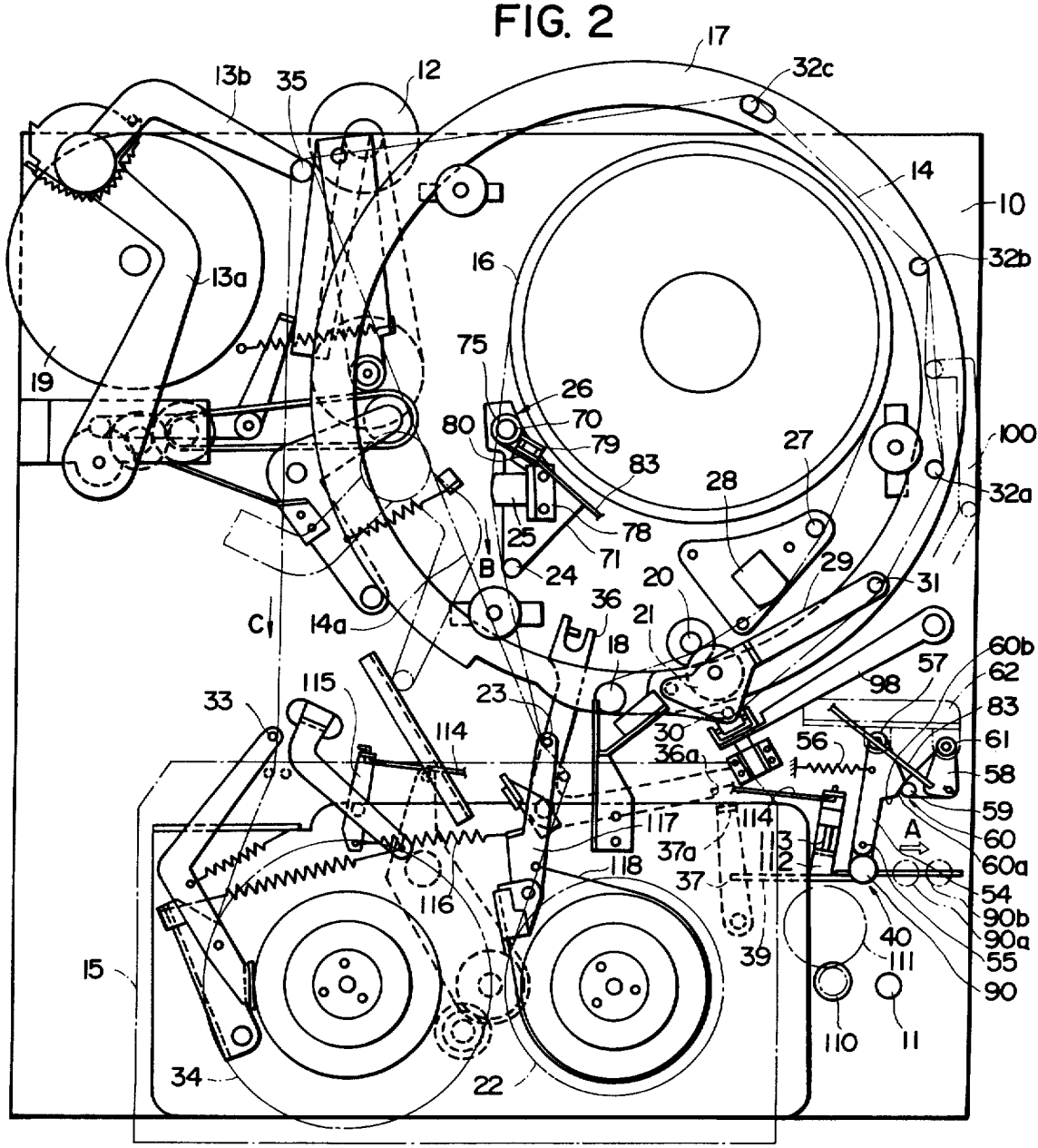
FIG. 2 is a similar plan view of the same apparatus in its reproducing mode of operation.

The magnetic reproducing apparatus of FIG. 1 is in its stopped mode. At the time of starting of its reproducing mode, a tape cassette 15 (containing a tape roll 22 on the tape supply side) and a tape roll 34 on the tape take-up side is loaded into a predetermined position as indicated by single-dot chain line in FIG. 1. Then, the play button 11 is depressed, whereby a loading motor 12 rotates. The rotation of the motor 12 is transmitted to mutually pin-connected, rotating arms 13a and 13b, which thereupon rotate to assume the state indicated in FIG. 2. As the arm 13b thus moves, a guide pole 35 embedded on the distal end thereof engages a magnetic tape 14, which is thereby drawn out of a cassette 15. A tape loop 14a is formed outside of the cassette 15, as shown in FIG. 2. Then a revolving ring 17, encompassing a guide drum 16 and held at an inclination relative to a chassis 10, rotates about the drum, in the clockwise direction, being driven by the motor 12. As a result, a plurality of guide poles embedded in the revolving ring 17 successively enter into the space within the tape loop 14a. The leading guide pole 18 catches the magnetic tape 14 and pulls it around the circumference of the guide drum 16.

When the revolving ring 17 turns through a specific angle, a main motor 19 is started. A rotating video head (not shown) in the guide drum 16 and a capstan 20 are rotated. When the revolving ring 17 rotates to the position indicated in FIG. 2, a pinch roller pressing mechanism, presses a pinch roller 21 against the capstan 20, with the tape 14 interposed therebetween. The tape 14 is driven in its traveling movement. As a result of the above described operation, the magnetic tape 14, which has been within the cassette 15, is automatically loaded or laid out along the predetermined tape travel path of the apparatus. At the same time, it assumes its state for the reproducing or playing mode. This automatic tape loading mechanism, and its operation is disclosed in detail in our U.S. Pat. No. 3,825,944.

At the time of the ordinary reproducing mode, the magnetic tape 14 is drawn out from a tape roll 22 on the supply side within the cassette 15. The tape tension is detected by a tension pole 23. After passing around a guide pole 24 and wrappingly contacting a full-width erasing head 25, the tape 14 is guided into wrapping contact along a helical path around a limited angular segment of the guide drum 16, by a tape guide mechanism 26 and a guide pole 27. At this time, the magnetic tape 14 travels along the cylindrical surface of the guide drum 16, being guided at its lower edge by a tape guide structure (not shown) secured to the cylindrical surface of the guide drum. The rotating head obliquely scans over the magnetic tape 14 to reproduce the video signals recorded on the tracks T1, T2, T3, . . . of the tape 14.

An audio signal and a control signal, recorded on the magnetic tape 14, are reproduced by a head assembly 28. The tape 14 is clamped between the capstan 20 and the pinch roller 21 rotatably supported on a lever 29 an is thereby driven in its traveling movement. The tape 14 is then almost reversed in its travel direction by the guide pole 18 and is guided by a guide pin 30 fixed the lever 29 and a pivot pin 31 of the lever 29. The tape 14 is further guided by guide pins 32a, 32b, and 32c fixed on the revolving ring 17 and further by the guide pole 35. After tape tension has been detected by a tension pole 33, the tape 14 is taken up on a tape roll 34 on the take-up side of the cassette 15. As the magnetic tape 14 travels through the tape travel path, the video signal recorded on the tape is ordinarily reproduced by the rotating head.

Next, for carrying out stop motion or still picture reproduction, the traveling movement of the magnetic tape is stopped at a specific instant during the ordinary reproducing mode.

First, the general arrangement of a stop motion or still picture reproduction control mechanism, 40 and the tape guiding mechanism 26 will be described. The still picture reproduction control mechanism 40 is shwon in FIGS. 3 and 4. A rotating lever 42 (FIG. 4A) and a still picture control lever 43 (FIG. 4B) are respectively pivoted at their lower ends on a holding plate 41 fixed to the chassis 10. Prior to control operation, the lever 42 is in a rotational position as indicated by full line in FIGS. 3 and 4A. An engagement pin 44 fixed on the lever 42 is engaged in a cutout 45a formed in an actuating lever 45. The still picture control lever 43 is urged to rotate in the counterclockwise direction, as viewed in FIG. 3, by the force of a tension spring 46 stretched between the lever 43 and the lever 42. However, the lever 43 is limited in rotation at the position indicated by full line in FIGS. 3 and 4B. There an engagement pin 48 fixed on the lever 42 and loosely disposed in a substantially rectangular opening 47 in the lever 43 is in contact with right-hand side edge of the opening 47, as viewed in FIGS. 3 and 4B.

Furthermore, both the engagement pin 48 and an engagement pin 49, fixed on the lever 43, extend through an opening 50 formed in holding plate 41 and further into an opening 53 formed in a lock plate 52. The plate 52 is pivoted at its left-hand end (FIG. 4D) and urged to rotate in the counterclockwise direction, by a tension spring 51, on the opposite side of the plate 41. The lever 42 is limited in its clockwise rotation at a position where its pin 48 is in contact with a shoulder part 50a of the edge of the opening 50. Furthermore, a bent part 42a of the lever 42 is coupled through a pin 55 to a cam plate 54 shown in FIG. 5.

As a result of the clockwise rotation of lever 42, the cam plate 54 is urged by a tension spring 56 to rotate in the clockwise direction about a shaft 57. It is limited in thus rotating at the position indicated in FIG. 2. A clockwise torque is applied to a plate 58 by a torsion spring 82. Plate 58 is limited in rotation by a stop pin 59 engaging a first cam surface 60a of a cam surface 60 of the cam plate 54.

A substantially L-shaped lock lever 36 is limited in rotation at its position indicated in FIG. 1. A rotating lever 37 is limited, in rotation, by the engagement of a bent part 37a at its distal end with a cutout 36a in the lock lever 36. This rotating lever 37 and the rotating lever 42 (FIG. 3) are linked by a rod 39 connected therebetween. Therefore, in the stopped mode, the lever 42 is limited in its counterclockwise rotation (FIG. 3) by the rod 39, and control movement in the arrow direction A of a still picture control knob 90 is limited.

Accordingly, it is impossible to comman a stop motion or still picture operation at the time of loading, resulting from the above mentioned play manipulation. However, when, in concert with the play manipulation, the revolving ring 17 revolves to the position indicated in FIG. 2, the loading operation is completed. The pinch roller pressing mechanism, operates. The lock lever 36 is interrelatedly rotated in the counterclockwise direction to the position indicated in FIG. 2. As a consequence, the bent part 37a is released from its engagement with the cutout 36a. The rotating lever 37 becomes free to rotate. The control knob 90 also assumes a state wherein it can be manipulated.

When a stop manipulation is carried out during normal reproducing operation, the apparatus carries out unloading operation. At the time of this unloading operation, the pinch roller pressing mechanism is placed in its inoperated state. The lock lever 36 is rotated in the clockwise direction, while the rotating lever 37 is locked. As a consequence, the manipulative movement of the still picture control knob 90 is limited. Furthermore, since fast forwarding and rewinding operations are carried out with the magnetic tape 14 within the cassette 15 (FIG. 1), the lock lever 36 holds the rotating lever 37 locked so that it cannot operate. The manipulation of the still picture control knob 90 is also limited at the time of fast forwarding and rewinding modes.

In the above described embodiment, furthermore, the lock lever 36 is adapted to assume an unoperated state, in accordance with the operation of the pinch roller pressing mechanism, which operates upon completion of the loading operation. Alternatively, however, the lock lever 36 may be adapted to be engaged and rotated by a member such as a projection provided on the revolving ring 17. Or, it may be rotated by an action means, such as an electromagnet, when the revolving ring 17 revolves to its position indicated in FIG. 2.

Figure 6:
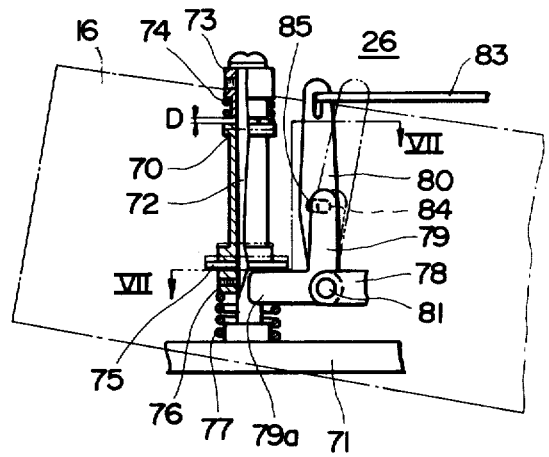
FIG. 6 is a fragmentary elevation view taken along the line VI—VI in FIG. 1, showing the inner mechanism of a tape guide.
Figure 7:
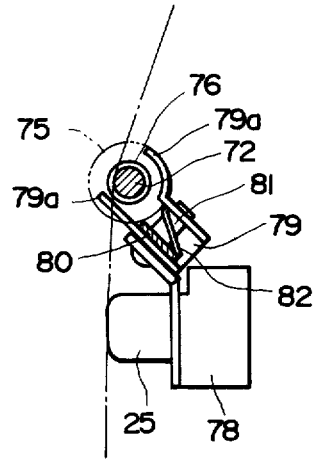
FIG. 7 is a plan view, with a part in section, taken along the line VII—VII in FIG. 6.

The tape guide mechanism 26 is as described below with reference to FIGS. 6 and 7. A tape guide 70 having a guide surface around its circumferential surface is slidably fitted on a stud pin 72 fixed at its lower end to a support base 71. Guide 70 is urged downwardly by the force of a compression spring 74 interposed between this tape guide 70 and an upper retainer 73. The tape guide 70, at its lower end, abuts against an annular plate 75 resting on a lower retainer 76 and is thereby vertically positioned. The upper and lower retainers 73 and 76 are positionally adjusted so that, at this time, a gap D is formed between the upper retainer 73 and the upper end of the tape guide 70. A coil spring 77 is disposed around the lower end part of the stud pin 72 and interposed between the lower retainer 76 and the support base. Spring 77 is used in the adjustment of the height position of the tape guide 70 by varying the height position of the lower retainer 76.

A holder 78 is fixed to the support base 71, supports the erasing head 25 mounted thereon, and pivotally supports a shift lever 79 and a rotating lever 80. The lever 80 is pivoted on a pin 81 and is urged by a torsion spring 82 (provided around the pin 81) to rotate in the counterclockwise direction, as viewed in FIG. 6. The rotation of the rotating plate 58 is restricted as shown in FIG. 2, and is limited at an angular position determined by the length of a rod 83. The force of the spring 82 is greater than that of the spring 74.

The shift lever 79 has shift arms 79a extending to a position below the annular plate 75 and has another arm in which is fixed an engagement pin 84. Pin 84 engages a slot 85, formed in the lever 80. Furthermore, the shift lever 79 is urged to rotate in the clockwise direction responsive to the action of the spring 82. However, it is limited in this rotation by the contact between the engagement pin 84 and the right-hand edge of the slot 85, as viewed in FIG. 6. The shift arms 79a are separated by a specific distance from the lower surface of the annular plate 75.

When a still picture is to be reproduced, with the apparatus in the ordinary reproduction mode, the still picture control knob 90 is turned in the arrow direction A, in FIGS. 2 and 3, against the force of the spring 56. Consequently, the lever 43 is rotated directly in the counterclockwise direction as viewed in FIGS. 3 and 4B. Simultaneously, the rotating lever 43 is also rotated unitarily in the counterclockwise direction. The engagement pin 48 engages the right-hand edge of the opening 47 in the lever 43. As a result of this rotation, the engagement pins 48 and 49 move to positions respectively confronting stepped edge parts 53b and 53a of the opening 53. The lock lever 52 is rotated by the spring 51 in the counterclockwise direction to the position indicated by single-dot chain line in FIG. 4D. As a consequence, the engagement pin 48 is caught and locked by the stepped edge 53b and vertical edge 53c of the opening 53. The levers 43 and 42 are locked in rotational positions respectively indicated by single-dot chain lines in FIGS. 4B and 4A. The knob 90 is locked in the position indicated by reference numeral 90a in FIG. 2.

As a result of the above described control operation, the cam plate 54 is rotated in the counterclockwise direction as viewed in FIGS. 2 and 5. Its pin 55 is engaged, and the actuating lever 45 is rotated in the clockwise direction as viewed in FIG. 3, being guided by the engagement pin 44.

In the apparatus of the instant embodiment, the tape guide mechanism, 26 is first operated by the cam plate 54. Then, the pinch roller pressing and separating device is operated by the actuating lever 45.

As a result of the rotation of the cam plate 54, the engagement pin 59 is guided to the position indicated by reference numeral 59a in FIG. 5, by a second cam part 60v of arcuate shape, with respect to the axis 57 of rotation of the cam plate 54. The rotating plate 58 is rotated in the counterclockwise direction, as viewed in FIG. 2, about the axis 61 of rotation. The cam plate 54 and the rotating plate 58 are both supported on the holding plate 62 fixed to the chassis 10. The above described rotation of the rotating plate 58 is transmitted through the rod 83 to rotate the rotating lever 80 and the shift lever 79, unitarily, in the clockwise direction, as viewed in FIG. 6.

Since, the force of the spring 82 is greater than that of the spring 74, the shift lever 79 is rotated unitarily with the rotating lever 80, by the force of the torsion spring 82. The shift arms 79a engage the annular plate 75 and apply an upward force thereto, thereby displacing the tape guide 70 upwardly against the force of the spring 74, through a distance D, to a position where the tape guide 70 strikes the upper retainer 73. The tape guide 70 is then held positively by the force of the spring 82, in the position where it is in contact against the upper retainer 73. If the rotating lever 80 is rotated further in the clockwise direction, it is rotated against the force of the spring 82, independently of the shift lever 79.

As a result of this upward shifting of the tape guide 70, through the distance D, the magnetic tape 14 is guided by upper and lower flanges and displaced upwardly, in its travel path on the side where it starts to wrappingly contact the guide drum 16.

Figure 8:
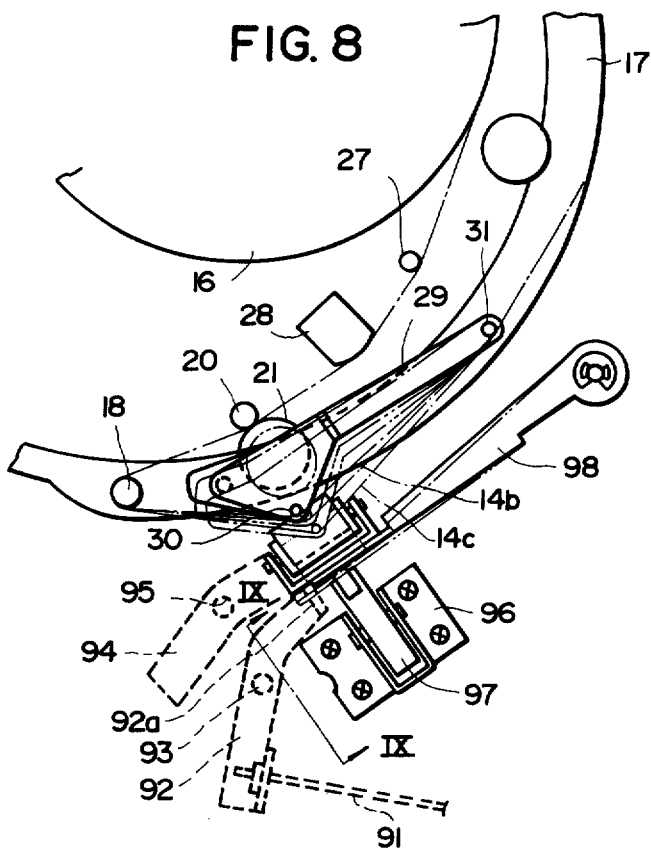
FIG. 8 is a partial plan view showing the state of a pinch roller of the apparatus of the invention at the time when still pictures are reproduced and the time when there is a small movement of the tape.

On one hand, the rotation against the force of the spring (not shown) of the actuating lever 45 is transmitted through a rod 91 to a release lever 92 shown in FIG. 8. It is thereby rotated counterclockwise about a pivot 93. A bent part 92a, of the release lever 92, engages the actuating lever 94 and rotates it counterclockwise about a pivot 95.

As a consequence, an L-shaped lever 97, pivotally supported on a support member 96, is released from a pressing force exerted by the actuating lever 94. A pinch roller pressing lever 98 and the pinch roller supporting lever 29 are rotated counterclockwise by a spring (not shown) to a position as indicated by single-dot chain line in FIG. 8. The pinch roller 21 is thus separated from the capstan 20. Consequently, the magnetic tape 14 is released from the clamping and driving force, and is stopped from traveling by loads acting upon it, including the back tension on the tape supply side.

In this connection, in order to arrest the tape travel, a brake mechanism may be provided to act on a part, such as a reel disc, as a result of the above described control operation. Furthermore, the loop of the magnetic tape 14 expands, as viewed in FIG. 8. By suitably setting the positions of the lever 29 and the pin 31, the tape loop may be prevented from varying in the above described operational state.

After the tape guide 70 has been shifted in the above described apparatus, the magnetic tape 14 further travels slightly during a very short time and thereafter stops traveling. For this reason, the travel path of the magnetic tape 14 is changed, not only in the vicinity of the tape guide 70, but over the entire path, where it wrappingly contacts the guide drum 16. Therefore, the magnetic tape 14 assumes a state of being wrapped helically around the guide drum 16, with a specific wrapping contact angle, over the entire range of its contact with the cylindrical surface of the guide 16. The wrapping contact angle has been uniformly increased, relative to the guide drum 16, without bending the tape 14 on the cylindrical surface of the guide drum 16.

Furthermore, the shift distance D of the tape guide 70 is set at a value corresponding to the track pitch (P in FIG. 10) of the magnetic tape 14. For this reason, the tape 14 wrapping the cylindrical surface of the guide drum 16 is inclined so that video tracks T1, T2, T3, . . . will be parallel to the scanning path of the rotating head (not shown) on the magnetic tape.

Although the video tracks T1, T2, T3, . . . of the magnetic tape 14 become inclined and parallel to the rotating path of the rotating head (not shown), they do not necessarily scan accurately over the scanning path of the rotating head. For example, the path followed by the head scanning over the stopped magnetic tape 14 is as indicated by the single-dot chain line t1 in FIG. 10. This scanning path t1 is formed substantially within the guard band between the video tracks T1 and T2. Therefore, much noise appears in the reproduced still picture, which becomes deteriorated. Furthermore, mutually adjacent tracks T1 and T2 may be formed without alignment of horizontal synchronizing signals in the direction perpendicular to the longitudinal direction of the tracks. The resulting still picture is then accompanied by noise because of the positionally offset relationship between the horizontal synchronizing signals of the two tracks.

Therefore, it becomes necessary, to advance the magnetic tape 14 through a minute distance, in the longitudinal direction, over the cylindrical surface of the guide drum 16. This small advance causes the rotating head to trace accurately the video tracks on the tape.

Accordingly, in the reproducing apparatus of the present invention, the magnetic tape 14 is moved through the above mentioned minute distance by manipulating the still picture control knob 90, which is locked in the position indicated by reference numeral 90a in FIG. 2, further in the arrow direction A. As a result of moving control knob 90 further in the arrow direction A, the still picture control lever 43 and the rotating lever 42 are rotated to the positions indicated by two-dot chain lines in FIGS. 4B and 4A. The still picture control knob 90 is moved in accordance with the control manipulation to the position indicated by reference numeral 90b in FIG. 2. With the apparatus in this operational state, the still picture control knob 90 is not being subjected to any locking action whatsoever, and is being urged by forces such as the tension of the spring 56 to return to the lock position.

Furthermore, as the levers 43 and 42 rotate, the cam plate 54 and the actuating lever 45 are further rotated in the same direction as that at the time of still picture control. As a result of this rotation of the cam plate 54, the engagement pin 59 is guided to the second cam part 60b and moves relatively to the position indicated by reference numeral 59b in FIG. 5. The rotating plate 58 does not rotate. The tape guide mechanism 26 is held in the aforedescribed state.

Figure 9:
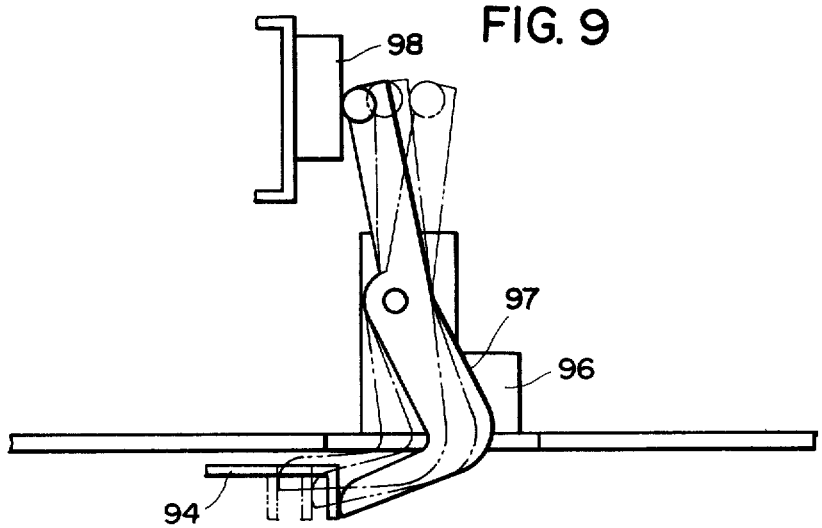
FIG. 9 is an elevational view taken along the line IX—IX in FIG. 8, showing a pinch roller control mechanism.

When the actuating lever 45 rotates to the position indicated by two-dot chain line in FIG. 3, its movement is transmitted through the rod 91 and levers 92 and 94 to rotate the lever 97 further in the clockwise direction, to the position indicated by two-dot chain line in FIG. 9. The lever 98 is released. As a consequence, the lever 29 is released and, together with the lever 98, is rotated further in the counterclockwise direction by a spring (not shown) to the position indicated by two-dot chain line in FIG. 8.

As a consequence, the length of the tape loop is changed. More particularly, the tape loaded in the predetermined tape traveling path, the tape part guided by the guide pole 18 fixed on the revolving ring 17, the guide pin 30 held on the lever 29, and the pin 31 on the revolving ring 17, are spread. The tape loop is changed in form from the loop designated by reference numeral 14b to that designated by 14c in FIG. 8.

At the time of still picture reproducing, while the travel of the magnetic tape 14 is stopped, the brake tension applied in the arrow direction B (FIG. 2) is of the order of 30 to 60 gram centimeters (gr.cm.). The tape winding force on the takeup side, in the arrow direction C, is of the order of 100 gr.cm. For this reason, a length of tape corresponding to the amount of tape loop expansion, as described above, is paid out from the tape roll 22 on the tape supply side. Therefore, as a result of the above described manipulation of the still picture control knob 90, the magnetic tape 14, which is stopped substantially in the state indicated in FIG. 2, moves, in its part in wrapping contact with the guide drum 16, in the forward direction by an amount equal to the above mentioned expansion of the tape loop.

When the still picture control knob 90 is released from its manipulative control, it returns to the lock position designated by reference numeral 90a in FIG. 2. The levers 42 and 43 return to the positions indicated by single-dot chain lines in FIGS. 4A and 4B. The pinch roller pressing mechanism also reverses the above described motion. The lever 29, being pressed by the lever 98, returns to the position indicated by the single-dot chain line in FIG. 8. At this time, the tape loop 14c contracts to become the tape loop 14b. A length of the tape corresponding to this contraction is taken up on the tape roll 34 on the take-up side.

The minute movement of the magnetic tape 14, on the cylindrical surface of the guide drum 16, is appropriately adjusted by a number of repeated manipulations (or partial manipulations) of the still picture control knob 90, in the arrow direction A.

Figure 10:
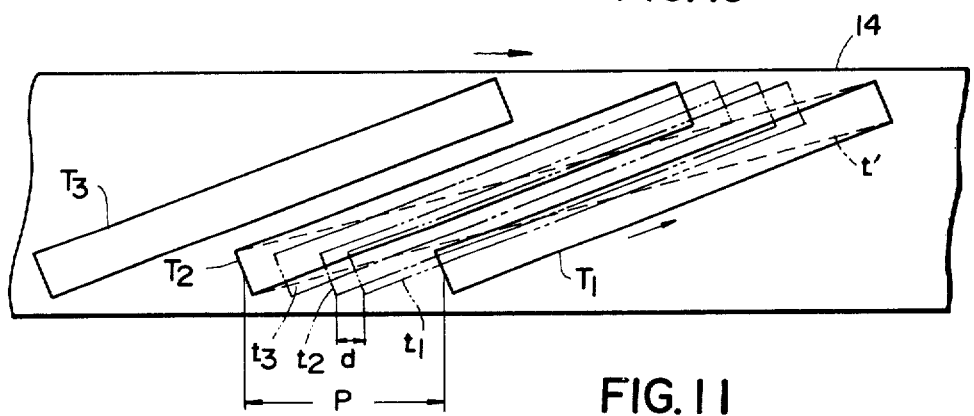
FIGS. 10 and 11 are plan views respectively showing track patterns on a magnetic tape.

At the time of still picture reproduction, if the rotating head (not shown) is scanning a part as indicated by scanning path t1 on the magnetic tape 14 as shown in FIG. 10, and if noise is appearing in the still picture, the still picture control knob 90 is manipulated in the above described manner. The tape 14 is moved in the forward direction by a tape length (as indicated by $d$ in FIG. 10) corresponding to the difference between the tape loops 14c and 14b. The rotating head scans a part designated by scanning path t2 in FIG. 10 in the vicinity of the video track T2. When the still picture control knob 90 is manipulated once more, the magnetic tape 14 moves further by a minute distance in the forward direction. The rotating head scans as indicated by a scanning path $t3$ in FIG. 10. Then, when the knob 90 is further manipulated, the rotating head is caused to scan substantially the track T2, and a still picture is reproduced with reduced noise is reproduced.

In the above described embodiment, interrelatedly with the manipulation of the still picture control knob 90, the lever 29 is further rotated in the inoperative direction. The tape loop is expanded by means of the guide pin 30, thereby to slightly move the magnetic tape 14 on the cylindrical surface of the guide drum 16. However, the apparatus of the invention is not limited in any manner to this arrangement. For example, it is also possible to employ an arrangement having a tape loop changing lever 100 which is rotated in the counterclockwise direction to the position indicated by two-dot chain line in FIG. 2. The manipulation of the still picture control knob 90 presses against the magnetic tape 14 which is passing by the guide drum 16. This tape is being guided by guide pins 32a and 32b fixed on the revolving ring 17. This contracts and changes the shape of the tape loop. A length of the tape corresponding to the amount of this tape loop change is moved in the forward direction.

In the above described embodiment, means are provided to change the wrapping contact angle of the magnetic tape 14 relative to the guide drum 16 at the time of still picture reproduction. However, this tape guide mechanism 26 is not absolutely necessary. It is possible to apply the present invention to an apparatus which does not have the tape guide mechanism 26. In this case, the scanning path of the rotating head at the time of still picture reproduction becomes as indicated by the intermittent line $t'$ in FIG. 10. By causing the tape 14 to travel through a minute distance and changing the position at which the scanning path $t'$ crosses the video tracks T1, T2, ..., it is possible to move guard band noise to a position where it will not be conspicuous in the still picture.

Furthermore, for changing over the apparatus from the still picture reproducing mode to the normal reproducing mode, the still picture control knob 90 is manipulated in the direction opposite to the arrow direction A. By this manipulation, the actuating lever 43 is first rotated against the force of the spring 46 independently of the locked rotating lever 42. During this rotation, the engagement pin 49 contacts and presses against the inclined part 53d of the opening 53. The lock lever 52 is rotated clockwise against the force of the spring 51. As a consequence, the engagement pin 48 is released from engagement by the lock lever 52, whereby the still picture control lever 43 and the rotating lever 42 are rotated and returned to their original positions. Consequently, the tape guide mechanism 26 and the pinch roller pressing mechanism return to their original states. Normal reproducing is thus restarted.

Next, a skew adjustment will be described with reference to FIG. 2. When a skew adjustment knob 110 is turned in the clockwise direction, a sprocket 111 rotates a lever 112, of approximately U-shape, counterclockwise about a shaft 113. Motion is further transmitted by way of a rod 114 to rotate a lever 115 in the counterclockwise direction. As a consequence, the tension force of a spring 116 is reduced, and the torque of a tension arm 117 decreases. That is, the operational force of a band brake 118 decreases. The back tension is reduced in the arrow direction B of the magnetic tape 14 drawn out from the tape roll 22 on the supply side.

Conversely, when the skew adjustment knob 110 is turned in the counterclockwise direction, the above mentioned mechanical parts move in the opposite directions. As a consequence, the tension force of the spring 116 increases, and the operating force of the band brake 118 increases. As a result, the back tension of the tape 14 drawn out from the tape roll 22 increases.

Figure 11:
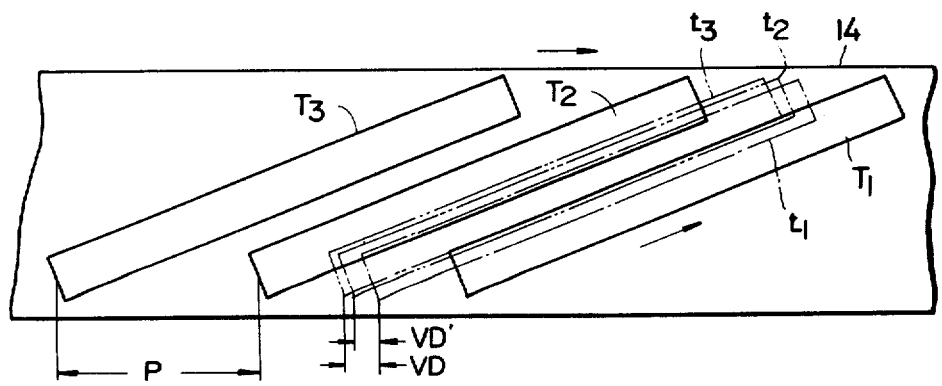

When the skew adjustment knob 110 is turned in the clockwise direction, and with reduced back tension in the arrow direction B, the tape loop of the tape 14 is expanded by the above described manipulation of the still picture control knob 90. The tape length corresponding to the amount of tape loop expansion is paid out from the tape roll 22 on the supply side. As a result, the part of the tape 14 in wrapping contact with the guide drum 16 is moved in the forward direction by a tape length (indicated by VD in FIG. 11) corresponding to the amount of tape loop expansion. The rotating head scans the part indicated by the scanning path t3 at the position displaced by the distance VD from the scanning path t1 in FIG. 11.

When the skew adjustment knob 110 is turned in the counterclockwise direction, increased and with back tension in the arrow direction B, the tape loop of the tape 14 is expanded in the above described manner by the above described manipulation of the still picture control knob 90. The tape length of the amount of tape loop expansion is paid out from the tape roll 34 on the take-up side together with the tape roll 22 on the supply side. The part of the tape 14 in wrapping contact with the guide drum 16 is moved in the forward direction by a tape length (indicated by VD' in FIG. 11) paid out from the tape roll 22 on the supply side. As a result, the rotating head scans the part indicated by the scanning path t2 at the position displayed by the distance VD' from the scanning path $t1$ in FIG. 11.

In this connection, the positions of the scanning paths t2 and t3 relative to the original scanning path t1 are appropriately adjusted by varying the ratio of the back tension in the arrrow direction B and the take-up force in the arrow direction C, by varying the rotational position of the skew adjustment knob 110.

Accordingly, the skew adjustment knob 110 is adjusted beforehand, to a specific position, at the time of the manipulation of the still picture control knob 90. The forward movement of the tape 14 on the cylindrical surface of the guide drum 16 is finely adjusted in accordance with the manipulation of the still picture control knob 90 in the arrow direction A, up to the position designated by reference numeral 90b in FIG. 2. As a result, the skew adjustment knob 110 is set at a specific position and the still picture control knob 90 is repeatedly manipulated. It is possible to move the tape 14 forward on the cylindrical surface of the guide drum 16 to cause a displacement of the scanning path of the rotating head with respect to the tape 14. This causes the scanning track to coincide accurately with the video tracks T1, T2, T3, . . . . and to reproduce a still picture, in which noise is reduced.

Further, this invention is not limited to these embodiments but various variations and modifications may be made without departing from the scope and spirit of the invention.

What is claimed is:

1. A stop motion video signal reproducing apparatus comprising:
   a guide drum means having a cylindrical surface and including at least one rotating video head;
   a tape cassette containing a tape wound upon a tape supply roll and a tape take-up roll with a portion extending between the two rolls, said tape having video signals recorded thereon;
   automatic loading means for automatically withdrawing the portion of the recording tape extending between said rolls out of the cassette and loading the same in a predetermined helical tape traveling path in the apparatus, said helical path having a pitch angle of inclination with respect to said guide drum, wrapping a part of the tape around the cylindrical surface of the guide drum and over a specific angular extent thereof;
   driving means for causing the tape thus loaded in the predetermined tape traveling path to travel;
   stop motion means for stopping the driving means and thereby stopping the travel of the tape, and means for adjusting the pitch angle of inclination of said helical path;
   displacing means operating while the tape travel is stopped in order to change the length of the tape in the tape traveling path, thereby to cause a forward longitudinal displacement of the part of the tape which is in wrapping contact with the guide drum; and
   control means for actuating the displacing means in the tape displacing operation in a manner such that the rotating head scans tracks which are recorded on the tape, while the tape is stopped, thereby to afford desirable reproduction of a stop motion still picture.

2. A video signal reproducing apparatus as claimed in claim 1 in which the displacing means is one of a plurality of tape guide members for guiding the tape along the predetermined tape traveling path, said displacing means undergoing a displacement responsive to operation of the control actuation means to change the length of the predetermined tape traveling path.

3. A video signal reproducing apparatus as claimed in claim 2 in which said one tape guide member is mounted on a displaceable member at a position for guiding the tape in the predetermined tape traveling path between the guide drum and the tape take-up roll, the tape length of the predetermined tape traveling path being increased by a certain amount responsive to a displacement of said one tape guide, and a length of tape equal to said amount of increase being paid out from the tape supply roll.

4. A video signal reproducing apparatus as claimed in claim 2 in which: the tape driving means comprises a capstan rotating positively under power, a pinch roller rotated by being pressed against the capstan with the tape interposed therebetween, and a holding structure for holding the pinch roller in a rotatable state at one end thereof, said holding structure being pivotally supported at the other end thereof, the capstan and the pinch roller operating cooperatively to drive the tape in said travel; the tape stopping means comprising means for causing a displacement and separation of the pinch roller together with the holding structure from the capstan; said one tape guide member being provided on the holding structure; and the actuating control means comprising means for displacing the holding structure in a manner such that said one tape guide member changes the length of the tape traveling path.

5. A video signal reproducing apparatus as claimed in claim 1 in which said means for altering said pitch angle of inclination comprises a pair of tape guide members for obliquely guiding said part of the tape in wrapping contact along said helical path over the cylindrical surface of the guide drum within the specific angular extent thereof, and means operating interrelatedly with the operation of the stopping means to vary the tape guiding height position due to at least one of the pair of tape guide members in a manner such that the travel of the tape is stopped after the tape guiding height position was varied, the guided height position of the tape being so varied and the pitch angle of inclination of the helical path being so varied that the path scanned by the rotating head at the time when the travel of the tape is stopped assumes substantially the same inclination as the path scanned by the rotating head during the tape travel.

6. A video signal reproducing apparatus as claimed in claim 1 in which there is further provided means for imparting adjustable back tension to the tape paid out from a tape roll in the tape cassette and for correcting skew distortion in the reproduced picture, and the tape length paid out from the tape supply roll at the time of the variation of the length of the tape traveling path being controlled by a cooperative operation of the skew distortion correcting means and of the tape displaying means.

7. A video reproducing apparatus as claimed in claim 1 in which a single operation of the actuating control means has additional means for actuating the tape stopping means in two steps, the first of said steps occurring at the time of normal operation reproduction, and the second step occurring after the first step and while the tape travel is stopped.

8. A video signal reproducing apparatus as claimed in claim 1 which further comprises lock means operating to lock the actuating control means in its unoperated state and to unlock the actuating control means only when the apparatus is carrying out normal reproducing operation with the tape in traveling movement.

* * * * *